March 23, 1965  J. M. DELINE  3,174,361
POSITIVE DRIVE AXLE CONSTRUCTION
Filed June 10, 1963  2 Sheets-Sheet 1

INVENTOR.
JACK M. DELINE
BY
*Fishburn & Gold*
ATTORNEYS

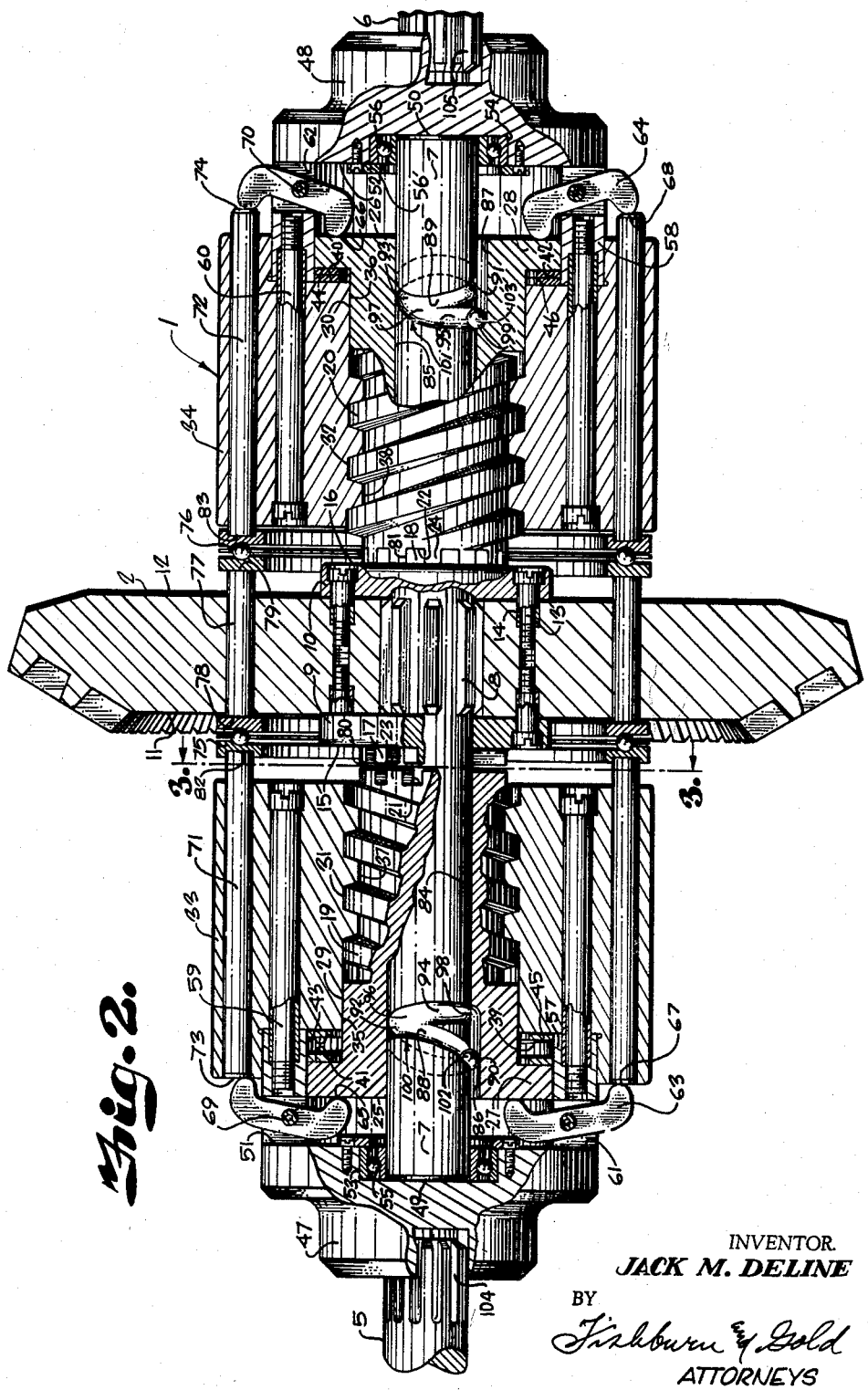

United States Patent Office 3,174,361
Patented Mar. 23, 1965

3,174,361
POSITIVE DRIVE AXLE CONSTRUCTION
Jack M. Deline, Rte. 2, Belton, Mo.
Filed June 10, 1963, Ser. No. 286,622
5 Claims. (Cl. 74—650)

This invention relates to a positive drive axle construction, and more particularly to an improved substitute device for torque dividing mechanism commonly described as differential gearing.

In common automotive construction, a longitudinally extending drive shaft is geared to the driving wheels through a so-called ring or drive gear which drives a differential frame for rotating a plurality of bevel pinions or the like with their axes radial to the wheel axles. The bevel pinions mesh with opposed master gears respectively rotatably fixed to the two wheel axle shafts. This convention construction divides the torque between the two driving wheels, permitting the outside wheel to overrun the inside wheel in turning curves. Such construction, however, has the disadvantage of reducing the applied torque of the slower running wheel to approximately that of the faster running wheel. Thus, if one wheel is bearing upon a slippery surface such as ice, snow or mud, the other wheel, though on a firm high-friction surface, cannot materially aid in driving the vehicle. A further disadvantage of conventional differential gearing is the high running friction loss.

Positive drive differential gearing substitutes have been offered heretofore; however, such devices have generally been unsatisfactory in operation primarily due to one or more of the following reasons: (a) the use of sliding friction clutch surfaces which tended to wear rapidly, (b) high cost and complexity, (c) large weight and volume, (d) noisy operation, (e) slow torque transfer between wheel axles, and (f) poor operation in reverse.

The principal objects of the present invention are: to provide an improved drive axle construction which produces positive driving of the wheel axle presenting the greatest resistance to forward vehicle motion; to provide such a positive drive mechanism which operates with positive interlock thus avoiding sliding friction clutching devices; to provide such a mechanism which is quiet in operation and quickly switches the torque load to the wheel axle exhibiting the greatest torque resistance; to provide such a differential substitute which operates in a satisfactory manner when the vehicle is in reverse; to provide such a drive axle construction having a high torque transmission ability and low running friction loss for the relative size and weight thereof; and to provide such a device which tends to drive both wheels with equal torque under straight-away driving conditions and is simple in construction in comparison with prior art devices intended for the same purpose.

Other objects and advantages of this invention will become apparent from the following description taken in connection with the accompanying drawings wherein are set forth by way of illustration and example certain embodiments of this invention.

FIG. 2 is a partially fragmentary vertical cross-sectional view through the axle construction taken essentially along the line 2—2, FIG. 1 on an enlarged scale, showing the internal construction thereof.

Figure 3:
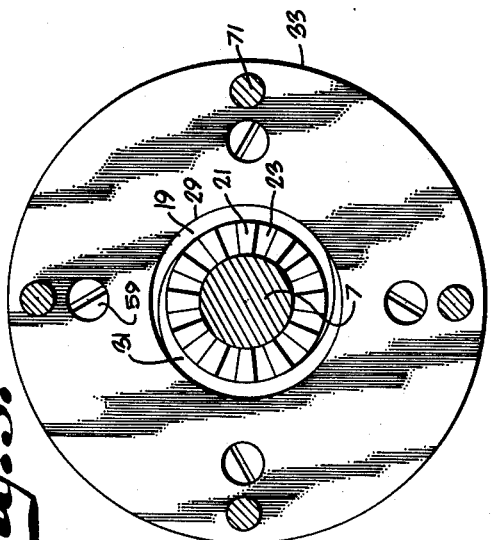
FIG. 3 is a transverse cross-sectional view through the axle construction taken on the line 3—3, FIG. 2, particularly showing positive engaging torque lugs on a clutch sleeve.

Rerefrring to the drawings in more detail:

The reference numeral 1 generally indicates a positive drive axle construction embodying this invention. The axle construction 1 is particularly adapted as a substitute for the differential gearing of automobile vehicles and the like and includes a central bevel drive gear 2 adapted to be rotated in a conventional manner by a suitable shaft-driven pinion (not shown) in a first direction indicated by the arrow 3, FIG. 1, for driving the vehicle forward and in a second direction, indicated by the arrow 4, for driving the vehicle in reverse. The gear 2 drives the vehicle through oppositely extending splined wheel axles respectively designated 5 and 6.

A stub shaft 7 coaxially extends through and in opposite directions past the drive gear 2 and is splined thereto at 8 for rotation therewith. A pair of opposed positive clutch plates 9 and 10 are respectively fixed to opposite sides 11 and 12 of the drive gear 2 by means of suitable circumferentially spaced axially extending screws 13 surrounded, in the illustrated example, by high strength aligning sleeves 14. The clutch plates 9 and 10 surround the stub shaft 7 and each has an outer face 15 and 16 directed away from the drive gear 2. The faces 15 and 16 respectively have circumferentially spaced drive lugs 17 and 18 extending therefrom axially away from the drive gear 2.

A pair of opposed clutch sleeves 19 and 20 are rotatably and axially slidably mounted on the stub shaft 7 on the opposite sides of the drive gear 2. The clutch sleeves 19 and 20 each have an inner end face 21 and 22 with respective sets of circumferentially spaced drive lugs 23 and 24 extending therefrom axially toward the drive gear 2. The clutch plate outer face lugs 23 and 24 are axially engageable with the clutch sleeve inner face lugs 21 and 22 and the respective sets of lugs present substantially square mating profiles for positive high strength rotational locking of the drive gear 2 with respect to the clutch sleeves 19 and 20.

The clutch sleeves 19 and 20 each have an outer circular face 25 and 26 respectively extending radially outwardly and coincident with radial flanges 27 and 28 which are located at the outer end of each of the clutch sleeves. The clutch sleeves 19 and 20 also have an outer cylindrical surface 29 and 30 respectively of substantially smaller diameter than the outer diameter of the radial flanges 27 and 28 and helical screw threads 31 and 32 are respectively cut thereinto along the major length thereof. The screw threads 31 and 32 are of opposite hand and lead axially away from the drive gear 2 when the clutch sleeves 19 and 20 are rotated in the forward direction 3.

A pair of opposed housing sleeves 33 and 34 surround the respective clutch sleeves 19 and 20 and have respective inside cylindrical surfaces 35 and 36 with internal matching helical screw threads 37 and 38 engaged with the respective clutch sleeve screw threads 31 and 32. The housing sleeves 33 and 34 have outer end counterbores 39 and 40 respectively forming radial surfaces 41 and 42 opposed to the inside radial surfaces 43 and 44 formed by the clutch sleeve radial flanges 27 and 28. The surfaces 41 and 43 and the surfaces 42 and 44 are respectively spaced apart and helical compression springs 45 and 46 respectively are located therebetween and surrounding the clutch sleeves 19 and 20.

A pair of opposed hub members 47 and 48 are respectively coaxially aligned with the stub shaft 7 at opposite ends 49 and 50 thereof. The hub members 47 and 48 each have an inner face 51 and 52 with a central blind bore 53 and 54 extending thereinto and opening toward the drive gear 2. Suitable bearings such as ball bearings 55 and 56 are supported by retainers 56' in the blind bores 53 and 54 and respectively receive the opposite ends 49 and 50 of the stub shaft 7, permitting coaxial independent rotation of the hub members 47 and 48 with respect to the stub shaft.

The hub members 47 and 48 have cylindrical tubular extensions 57 and 58 integral therewith and projecting axially inwardly from the respective hub member inner faces 51 and 52 into the housing sleeve counterbores 39 and 40 and abutting the respective radial surfaces 41 and 42. A plurality of circumferentially spaced screws 59 and 60 respectively extend axially through the housing sleeves 33 and 34 and threadedly engage with the tubular extensions 57 and 58 for fixing the hub members 47 and 48 with respect to the housing sleeves. The clutch sleeve radial flanges 27 and 28 are rotatably and axially slidably received within the tubular extensions 57 and 58.

A plurality of circumferentially spaced radially extending passageways 61 and 62 respectively project through the tubular extensions 57 and 58 adjacent the hub member inner faces 51 and 52. Rocker arms 63 and 64 respectively radially extend through the passageways 61 and 62 and have inner ends 65 and 66 projecting within the tubular extensions 57 and 58 and outer ends 67 and 68 projecting externally of the respective tubular extensions. Suitable pins 69 and 70 extend obliquely into the outer surface of the tubular extensions 57 and 58 and through the respective rocker arms 63 and 64 intermediate the inner and outer ends thereof within the respective passageways 61 and 62. The pins 69 and 70 mount the respective rocker arms for pivotal motion in radial planes containing the center line of the stub shaft 7.

The rocker arm inner ends 65 and 66 slidably engage the respective clutch sleeve outer end faces 25 and 26 within the tubular extensions 57 and 58. A plurality of circumferentially spaced housing slide rods 71 and 72 axially and slidably extend through the respective housing sleeves 33 and 34 and have outer ends 73 and 74 abutting the respective rocker arm outer ends 67 and 68.

Thrust bearings 75 and 76 surround the stub shaft 7 on each side of the drive gear 2 and have inside diameters greater than the outside diameters of the respective clutch plates 9 and 10. A plurality of circumferentially spaced drive gear slide rods 77 axially and slidably extend through the drive gear 2 and have opposite ends 78 and 79 engaging the respective thrust bearings 75 and 76. The drive gear slide rods 77 are greater in length than the width of the drive gear 2 by an amount at least as great as the axial distance which a clutch sleeve must travel to change from a fully disengaged position, as illustrated at 80, to a fully engaged position against the respective clutch plate as illustrated at 81.

The housing slide rods 71 and 72 have respective inner ends 82 and 83 engaging and supporting the thrust bearings 75 and 76 on the opposite sides thereof from the drive gear slide rods 77 whereby the slide rods 71 and 72 may travel simultaneously axially in response to reciprocal force exerted by the respective rocker arms while rotating or orbiting independently of each other about the stub shaft 7.

Figure 4:
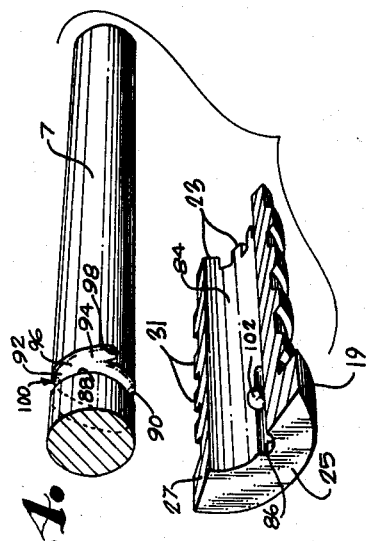
FIG. 4 is a fragmentary exploded view showing a ball extending partially into a clutch sleeve groove and adapted to simultaneously extend partially into a stub shaft groove assemblage for permitting relative rotation between the stub shaft and the clutch sleeve in one direction but preventing such relative rotation in the other direction.

The clutch sleeves 19 and 20 each have an inner cylindrical surface 84 and 85 respectively with a longitudinal groove 86 and 87 respectively extending therealong near the clutch sleeve outer ends. A pair of spaced apart curved continuous grooves designated 88 and 89 surround the stub shaft 7 and are located adjacent the respective longitudinal grooves 86 and 87. The continuous grooves 88 and 89, in the illustrated example, are in planes so slanted in opposite directions with respect to the stub shaft 7 that during each revolution of the stub shaft a pair of rotationally stationary longitudinally aligned points in the respective continuous grooves 88 and 89 vary simultaneously equally in distance from the drive gear 2 between a maximum separation position 90 and 91 and a minimum separation position 92 and 93. A pair of spaced apart branch grooves designated 94 and 95 are cut into the stub shaft 7 and respectively have open ends 96 and 97 and blind ends 98 and 99. The respective branch groove open ends 96 and 97 smoothly blend or open into the continuous grooves 88 and 89 respectively at the minimum separation positions 92 and 93. The branch grooves 94 and 95 are in planes normal to the stub shaft 7 and extend through angular arcs about the stub shaft in a rotational direction whereby rotationally stationary points in the respective branch grooves approach the blind ends 98 and 99 as the stub shaft is rotated in the direction 3. In other words, the branch grooves trail away from the minimum separation positions 92 and 93 when the stub shaft is rotated counterclockwise as viewed in FIG. 4. The respective continuous and branch grooves respectively form groove assemblages 100 and 101 on opposite sides of the drive gear 2 with a portion of the respective assemblage always exposed to the respective longitudinal groove 86 or 87. Balls 102 and 103 respectively rest partially in each of the longitudinal grooves 86 and 87 and extend into the respective groove assemblages 100 and 101 whereby any relative rotation between the stub shaft 7 and the respective clutch sleeves 19 and 20 will affect the position of the balls with respect to the stub shaft.

In operation, the axle construction 1 is rotatably supported within any suitable conventional gear housing (not shown) which maintains the drive gear 2 and hub members 47 and 48 axially retained with respect to each other. The wheel axles 5 and 6 are splined at 104 and 105 into the respective hub members 47 and 48 for rotation therewith. If the vehicle is driven in a forward direction and in a perfectly straight line with both drive wheels of the same diameter, both clutch sleeves will tend to partially engage with the respective clutch plates whereupon the driving torque is equally divided between both wheel axles 5 and 6. This is an unusual condition, however, and normally one of the axles 5 and 6 will tend to overrun the opposite axle due to slight road variations, negotiating a curve, or turning a corner. When this occurs, the faster rotating of the two axles will be disengaged from the drive gear 2 in the following manner:

Assuming that the wheel axle 5 tends to overrun the axle 6 while the vehicle is in forward motion, the hub member 47 will turn in the same direction but slightly faster than the drive gear 2. The hub member 47, being fixed to the housing sleeve 33, rotates same with respect to the drive gear 2. Since the stub shaft 7 is rotationally fixed with respect to the drive gear 2, relative motion is produced between the stub shaft and the housing sleeve 33. As long as the drive lugs 17 are engaged with the drive lugs 23, the relative motion will also exist between the clutch sleeve 19 and the housing sleeve 33 which, due to the lead direction of the helical screw threads 31, causes the clutch sleeve 19 to back away from the drive gear 2 until the respective lugs 17 and 23 are fully disengaged. This permits the wheel axle 5 to overun the wheel axle 6 and, when the clutch sleeve 19 has reached its furtherest position from the drive gear 2, the clutch sleeve 19 begins to rotate with the housing sleeve 33, thus producing a relative rotational motion between the clutch sleeve 19 and the stub shaft 7. This latter motion draws the ball 102 away from the blind end 98 of the branch groove 94 and urges the ball into the continuous groove 88 where it continues to orbit as long as the relative rotational direction remains the same.

When, however, there is a reversal in relative wheel shaft speed so that the shaft 6 begins to overrun the shaft 5, the clutch sleeve 19 will reverse its relative direction of rotation with respect to the stub shaft 7 and the ball 102 will be directed into the branch groove 94 and come to rest against the blind end 98. With the ball 102 in the blind end 98, relative rotation between the stub shaft 7 and the clutch sleeve 19 ceases, and the clutch sleeve 19 is driven toward the drive gear 2 while rotating at the same speed thereof and having a predetermined rotational location with respect to the clutch plate 9. The inward driving of the clutch sleeve 19 is due to the relative rotation between same and the housing sleeve 33 and causes the clutch sleeve 19 to be smoothly driven into synchronized engagement with the drive lugs 17, thus transferring the torque to the slower rotating wheel shaft 5 after the lugs 23 have bottomed out between the lugs 17. The tendency for shock loading upon bottoming out of the lugs 17 between the lugs 23 is substantially eliminated due to the simultaneous compression of the helical spring 45. The relative rotation of the wheel shafts which produces an engagement between the lugs 23 and 27 also operates to urge a disengagement between the drive lugs 18 and 24 due to the reverse lead of the screw threads 32. Due to the mechanical linkage between the clutch sleeves 19 and 20 through the rocker arm 63 and 64, slide rods 71 and 72, bearings 75 and 76, and slide rods 77, at no instant can both clutch sleeves 19 and 20 be disengaged. This prevents the possibility of both wheel axles 5 and 6 free wheeling.

Figure 1:
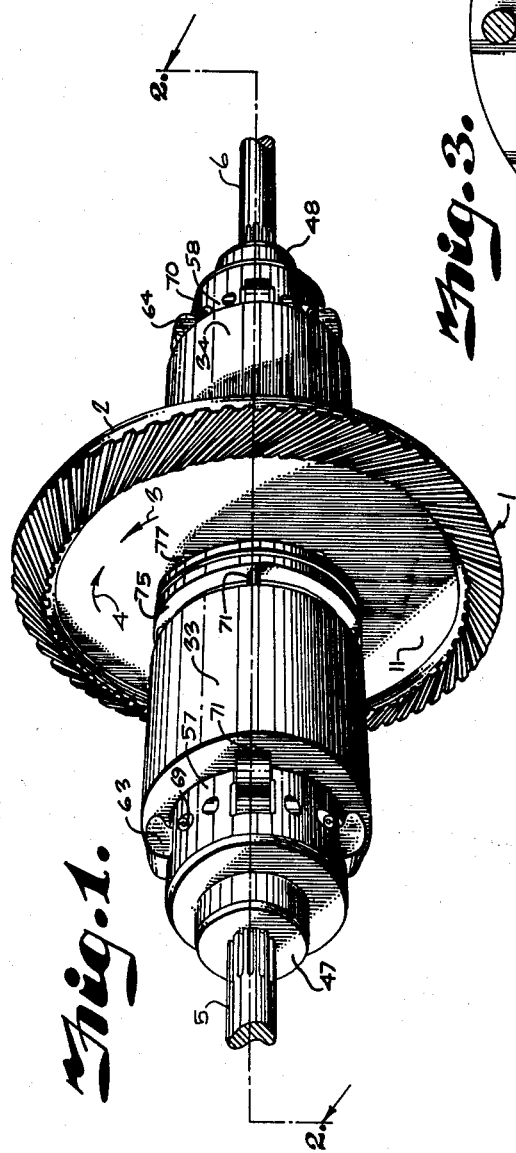
FIG. 1 is a perspective view of a positive drive axle construction embodying this invention.

Upon shifting the vehicle in reverse, the drive gear 2 is driven in the direction 4, FIG. 1, and the parts above described upon relative rotation between the axles 5 and 6 operate in reverse to engage the clutch sleeve 19 or 20 associated with the faster running of the two axles 5 and 6. Instead of the ball and groove systems, however, upon reverse operation the rocker arm linkage transfers force from the clutch sleeve which is disengaging to urge engagement of the opposing clutch sleeve. It is noted, however, that a clutch sleeve which has been engaged in forward motion will tend to stay engaged while the vehicle is in reverse so long as no significant relative motion is produced between the wheel axles 5 and 6.

The amount of relative rotation required to cause engagement and disengagement in operation may vary considerably due to variations in clutch sleeve thread lead, the arc of the branch grooves 90 and 91, and the depth of the engaging drive lugs, however, a desirable design would produce complete shifting of torque from one wheel to the other in less than one-quarter turn of relative rotation. In such a design, one-eighth turn of relative rotation from a fully engaged position of one of the clutch sleeves will produce partial engagement of both clutch sleeves whereupon the torque is equally divided between the wheel axles either on forward or reverse until further relative rotation requires complete disengagement of one of the wheel axles.

It is to be understood that while one form of this invention has been illustrated and described, it is not to be limited to the specific form or arrangement of parts herein described and shown except insofar as such limitations are included in the claims.

What I claim and desire to secure by Letters Patent is:

1. A positive drive axle construction for automotive vehicles and the like having oppositely extending coaxially spaced apart wheel axles, said construction comprising: a central rotatable drive member, shaft means extending axially between said wheel axles and oppositely past said drive member and being rotatably fixed to said drive member, a pair of opposed positive engaging clutch plates respectively rotatably fixed to opposite sides of said drive member, a pair of opposed clutch sleeves respectively rotatably and axially slidably mounted on said shaft means on opposite sides of said drive member and axially positively engageable with said respective clutch plates, said clutch sleeves respectively having outer screw threads thereon of opposite hand and leading axially away from said drive member when said clutch sleeves are rotated in a first direction, a pair of opposed housing sleeves respectively having internal matching helical screw threads engaged with said clutch sleeve screw threads, a pair of opposed hub members respectively rotatably fixed to said housing sleeves and wheel axles, and means cooperating between said respective clutch sleeves and said shaft means for preventing relative rotation therebetween in said first direction but permitting relative rotation therebetween in the opposite direction.

2. The construction as set forth in claim 1 wherein: said clutch sleeves each have a radial flange at the outer end thereof and said housing sleeves each have a counterbore at the outer ends thereof receiving said respective radial flanges, and resilient compression members in said respective counterbores and axially bearing against said clutch and housing sleeves for resiliently cushioning motion of said clutch sleeve toward said drive member.

3. The construction as set forth in claim 1 wherein said means cooperating between said respective clutch sleeves and shaft means comprises: a longitudinal groove extending along the inner surface of said respective clutch sleeves, a pair of spaced apart continuous grooves surrounding said shaft means and located adjacent said respective longitudinal grooves, said continuous grooves being in planes slanted in opposite directions with respect to said shaft means, a pair of spaced apart branch grooves on said shaft means and respectively having an open end and a blind end, said branch groove open ends smoothly blending into said respective continuous grooves, said branch grooves branching away from said continuous grooves and extending through angular arcs about said shaft means in said first direction, said continuous grooves and branch grooves respectively forming a groove assemblage on each side of said drive member, and a ball in each of said longitudinal grooves and extending into said respective groove assemblages.

4. The construction as set forth in claim 1 including: a tubular extension fixed with respect to each of said hub members and projecting axially toward said drive member, said clutch sleeves each having an outer end rotatably and axially slidable with respect to said tubular extensions, a plurality of circumferentially spaced radially extending passageways projecting through said tubular extensions, rocker arms extending through said respective passageways and having inner ends projecting within said tubular extensions and outer ends projecting externally of said tubular extensions, means pivotally mounting said rocker arms intermediate said inner and outer ends thereof for pivotal motion of said latter inner and outer ends toward and away from said drive member, said rocker arm inner ends slidably engaging said respective clutch sleeve outer ends, a plurality of circumferentially spaced housing slide rods axially slidable on said housing sleeves and respectively having outer ends engaging said rocker arm outer ends, an annular thrust bearing surrounding said shaft means on each side of said drive member, and a plurality of circumferentially spaced drive member slide rods axially and slidably extending through said drive member and having opposite ends engaging said respective thrust bearings, said drive member slide rods being greater in length than the width of said drive member by an amount at least as great as the axial distance a clutch sleeve travels from a fully disengaged position to a fully engaged position against said respective clutch plate, said housing slide rods having inner ends engaging said respective thrust bearings on the opposite sides thereof from said said drive member slide rods.

5. A positive drive axle construction for automotive vehicles and the like comprising: a central rotatable drive member, a stub shaft coaxially extending through and oppositely past said drive member and rotating therewith, a pair of opposed clutch plates fixed to opposite sides of said drive member and each having an outer face with drive lugs thereon, a pair of opposed clutch sleeves respectively rotatably and axially slidably mounted on said stub shaft on opposite sides of said drive member, said clutch sleeves each having an inner face with drive lugs thereon axially engageable with said clutch plate lugs for positive rotational locking of said drive member with respect to said clutch sleeves, said drive clutch sleeves each having an exterior helical screw thread thereon respectively of opposite hand and leading away from said drive member when said clutch sleeves are rotated in a first direction, a pair of opposed housing sleeves respectively surrounding said clutch sleeves and having internal matching helical screw threads engaged with said clutch sleeve screw threads, oppositely extending wheel axles rotatably fixed with respect to said respective housing sleeves, said clutch sleeves each having an inner surface with a longitudinal groove extending therealong, a pair of spaced apart continuous grooves surrounding said stub shaft and located adjacent said respective longitudinal grooves, said continuous grooves being in planes slanted in opposite directions with respect to said drive member, a pair of spaced apart branch grooves on said stub shaft and respectively having an open end and a blind end, said branch groove open ends smoothly blending into said respective continuous grooves, said branch grooves extending toward said open ends through angular arcs about said stub shaft in said first direction, said continuous grooves and branch grooves respectively forming a groove assemblage on each side of said drive member, and a ball in each of said longitudinal grooves and respectively extending into said groove assemblages, whereby driving said drive member in said first direction causes driving of the wheel axle presenting the greatest resistance to motion in said first direction and permits free wheeling of the other wheel axle in said first direction.

References Cited by the Examiner
UNITED STATES PATENTS

| | | | |
|---|---|---|---|
| 849,474 | 4/07 | Hedgeland | 74—650 |
| 1,254,540 | 1/18 | Ruden | 74—650 |
| 1,420,706 | 6/22 | Hupp | 74—650 |
| 2,667,088 | 1/54 | Myers | 74—650 |

DON A. WAITE, *Primary Examiner.*